(12) United States Patent
Chen

(10) Patent No.: US 6,994,189 B2
(45) Date of Patent: Feb. 7, 2006

(54) BRAKABLE WHEEL HUB DEVICE

(75) Inventor: Hubert Chen, Taichung Hsien (TW)

(73) Assignee: Kun Teng Industry Co., LTD, Taichung Hsien (TW)

( * ) Notice: Subject to any disclaimer, the term of this patent is extended or adjusted under 35 U.S.C. 154(b) by 0 days.

(21) Appl. No.: 10/936,096

(22) Filed: Sep. 7, 2004

(65) Prior Publication Data

US 2005/0034932 A1 Feb. 17, 2005

Related U.S. Application Data

(63) Continuation-in-part of application No. 10/392,992, filed on Mar. 18, 2003, now Pat. No. 6,854,569.

(51) Int. Cl.
*B62L 5/00* (2006.01)
(52) U.S. Cl. ............... 188/26; 188/17; 301/110.5
(58) Field of Classification Search ............... 188/17, 188/26, 24.11, 18 A, 218 XL; 301/6.8, 110.5, 301/110.6, 6.1; 192/217.3
See application file for complete search history.

(56) References Cited

U.S. PATENT DOCUMENTS

| 6,371,252 | B1 |   | 4/2002 | Kanehisa ..................... 188/26 |
| 6,386,328 | B1 | * | 5/2002 | Chen ....................... 188/24.11 |
| 6,530,457 | B1 | * | 3/2003 | Nago et al. .................. 188/26 |
| 6,571,920 | B1 | * | 6/2003 | Sturmer et al. ............... 188/26 |
| 6,578,676 | B1 | * | 6/2003 | Lin ............................. 188/26 |
| 6,843,536 | B2 | * | 1/2005 | Chen ....................... 301/110.5 |
| 6,854,569 | B2 | * | 2/2005 | Chen ........................... 188/26 |

* cited by examiner

*Primary Examiner*—Thomas Williams
*Assistant Examiner*—Mariano Sy
(74) *Attorney, Agent, or Firm*—DLA Piper Rudnick Gray Cary US LLP

(57) ABSTRACT

A brakable wheel hub device includes a wheel hub shell having a first surrounding threaded portion and a disk securing portion spaced apart from each other to define a disk mounting space for receiving a brake disk. The disk securing portion has a plurality of axially extending insert holes and engaging holes angularly displaced from and disposed alternately with one another. A positioning ring has a plurality of axially extending protrusions and brake stabilizing members angularly displaced from and disposed alternately with one another so as to pass through the brake disk for insertion into the insert and engaging holes, respectively. A surrounding locking member has a second surrounding threaded portion threadedly engaging the first surrounding threaded portion, and an abutting portion abutting against the positioning ring.

4 Claims, 5 Drawing Sheets

BRAKABLE WHEEL HUB DEVICE

CROSS-REFERENCE TO RELATED APPLICATION

This application is a continuation-in-part of U.S. patent application Ser. No. 10/392,992, filed by the applicant on Mar. 18, 2003 which is now U.S. Pat. No. 6,854,569 B2, the entire disclosure of which is incorporated herein by reference.

BACKGROUND OF THE INVENTION

1. Field of the Invention

This invention relates to a brakable wheel hub device, more particularly to a brakable wheel hub device adapted to detachably secure a brake disk so as to be rotatably mounted on a wheel axle of a bicycle.

2. Description of the Related Art

A conventional bicycle wheel hub, such as that disclosed in U.S. Pat. No. 6,371,252 B1 and U.S. Pat. No. 6,571,920 B1, is coupled to a brake disk to be rotatably mounted on a wheel axle of a bicycle, and generally includes a hub shell rotatably coupled to a hub axle, and having external peripheral splines, and a positioning adapter having internal surrounding splines to engage the external peripheral splines, and a connecting surface for fixing the brake disk. Due to the particular construction of the hub shell, manufacturing cost; is relatively high. To improve this problem, in U.S. patent application Ser. No. 10/392,992 which is now U.S. Pat. No. 6,854,569 B2, as shown in FIG. 1, the applicant disclosed a brakable wheel hub device 10 that comprises a wheel hub shell 13, a positioning ring 14, and a surrounding locking member 15.

The wheel hub shell 13 has a surrounding shell wall 131 which is rotatably mounted on a wheel axle 11 of a bicycle along an axis 110 by means of bearing members 12, and which has an internally threaded section 136 extending in an axial direction, and a disk securing portion 134 which extends from the surrounding shell wall 131 radially and outwardly, and which has a plurality of axially extending insert holes 135 (e.g., six insert holes). Further, two spoke mounting flanges 132, 133 extend radially and outwardly from the wheel hub shell 13 for engaging wheel spokes (not shown). A brake disk 20 is a standard brake disk, and has six angularly displaced through holes 21. The brake disk 20 surrounds the axle 11, and is disposed to align the through holes 21 with the insert holes 135, respectively.

The positioning ring 14 surrounds the axle 11, and includes inside and outside surrounding surfaces 141, 145 proximate to and distal from the brake disk 20, respectively. A plurality of protrusions 142 (e.g., six protrusions) extend from the inside surrounding surface 141 in the axial direction, and are angularly displaced from one another about the axis 110. Each protrusion 142 includes a larger-diameter segment 143 which extends from the inside surrounding surface 141 and which can be mounted in the respective through hole 21 in the brake disk 20, and a smaller-diameter segment 144 which extends from the larger-diameter segment 143 and which can be fitted into the respective insert hole 135 in the disk securing portion 134.

The surrounding locking member 15 includes an insert segment 152 which has an externally threaded section to threadedly engage the internally threaded section 136, and an abutting segment 151 which extends radially from the insert segment 152.

After the protrusions 142 are brought to pass through the respective through holes 21 and to be fitted into the respective insert holes 135 so as to place the brake disk 20 in a spline engagement with the wheel hub shell 13, the surrounding locking member 15 is mounted such that the externally threaded section threadedly engages the internally threaded section 136, and such that the abutting segment 151 frictionally abuts against the outside surrounding surface 145 of the positioning ring 14, thereby securing the brake disk 20 to the wheel hub shell 13.

To disassemble the brake disk 20 from the axle 11, the surrounding locking member 15 is operated to be screwed out of the wheel hub shell 13 so that the positioning ring 14 and the brake disk 20 can be easily detached from the axle 11.

With the construction as such, the wheel hub shell 13 of the brakable wheel hub device is easier to manufacture, and assembly and disassembly of the brake disk 20 to and from the wheel hub shell 13 are convenient to conduct.

It is desirable to improve the aforesaid brakable wheel hub device to provide an enhanced stabilizing force to the brake disk 20 during a braking action so as to reduce an impact resulting from a shearing force between the protrusions 142 and the through holes 21 and the insert holes 135.

SUMMARY OF THE INVENTION

The object of the present invention is to provide a brakable wheel hub device which can provide an improved stabilizing force to a brake disk during a braking action.

According to this invention, the brakable wheel hub device is adapted to secure a brake disk. The brake disk is a standard brake disk, and has an inner peripheral wall surrounding an axis to define a mounting hole, a plurality of through holes offset from the mounting hole and angularly displaced from one another about the axis, and a plurality of cutout portions each extending radially and outwardly from the inner peripheral wall and formed between two adjacent ones of the through holes. Each cutout portion has two lateral areas which are spaced apart from each other along a first circumferential line that is coaxial with the inner peripheral wall, and which extend radially and outwardly from the inner peripheral wall to converge on a vertex.

The brakable wheel hub device includes a wheel hub shell, a positioning ring, and a surrounding locking member. The wheel hub shell has a first surrounding threaded portion surrounding the axis, and a disk securing portion spaced apart from the first surrounding threaded portion along the axis to define a disk mounting space therebetween which is adapted to receive the brake disk. The disk securing portion has an abutting surface adapted to contact the brake disk. The abutting surface has a plurality of insert holes extending in an axial direction and angularly displaced from one another about the axis, and a plurality of engaging holes extending in the axial direction. Each engaging hole is formed between two adjacent ones of the insert holes. The positioning ring surrounds the axis, and includes inside and outside surrounding surfaces proximate to and distal from the abutting surface, respectively. A plurality of protrusions extend from the inside surrounding surface in the axial direction, and are respectively adapted to pass through the through holes in the brake disk so as to be fitted into the insert holes in the axial direction, thereby placing the brake disk in a spline engagement with the wheel hub shell. A plurality of brake stabilizing members extend from the inside surrounding surface in the axial direction, and are respectively disposed between two adjacent ones of the protrusions such that when the protrusions are brought to pass through the through holes and are fitted into the insert holes, respectively, the brake stabilizing members pass through the cutout portions of the brake disk and are inserted into the engaging holes, respectively. Each brake stabilizing member has two flanking walls opposite to each other along a second circumferential line that surrounds the axis so as to be brought into frictional engagement with the lateral areas of the corresponding cutout portion of the brake disk, thereby providing a stabilizing force to the brake disk during a braking action. The surrounding locking member includes a second surrounding threaded portion which is disposed to threadedly engage the first surrounding threaded portion, and an abutting portion which extends radially from the second surrounding threaded portion and which abuts against the outside surrounding surface of the positioning ring when the second surrounding threaded portion threadedly engages the first surrounding threaded portion, thereby forcing the inside surrounding surface to abut against the abutting surface of the disk securing portion of the wheel hub shell and to bring the protrusions and the brake stabilizing members into engagement with the insert holes and the engaging holes, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
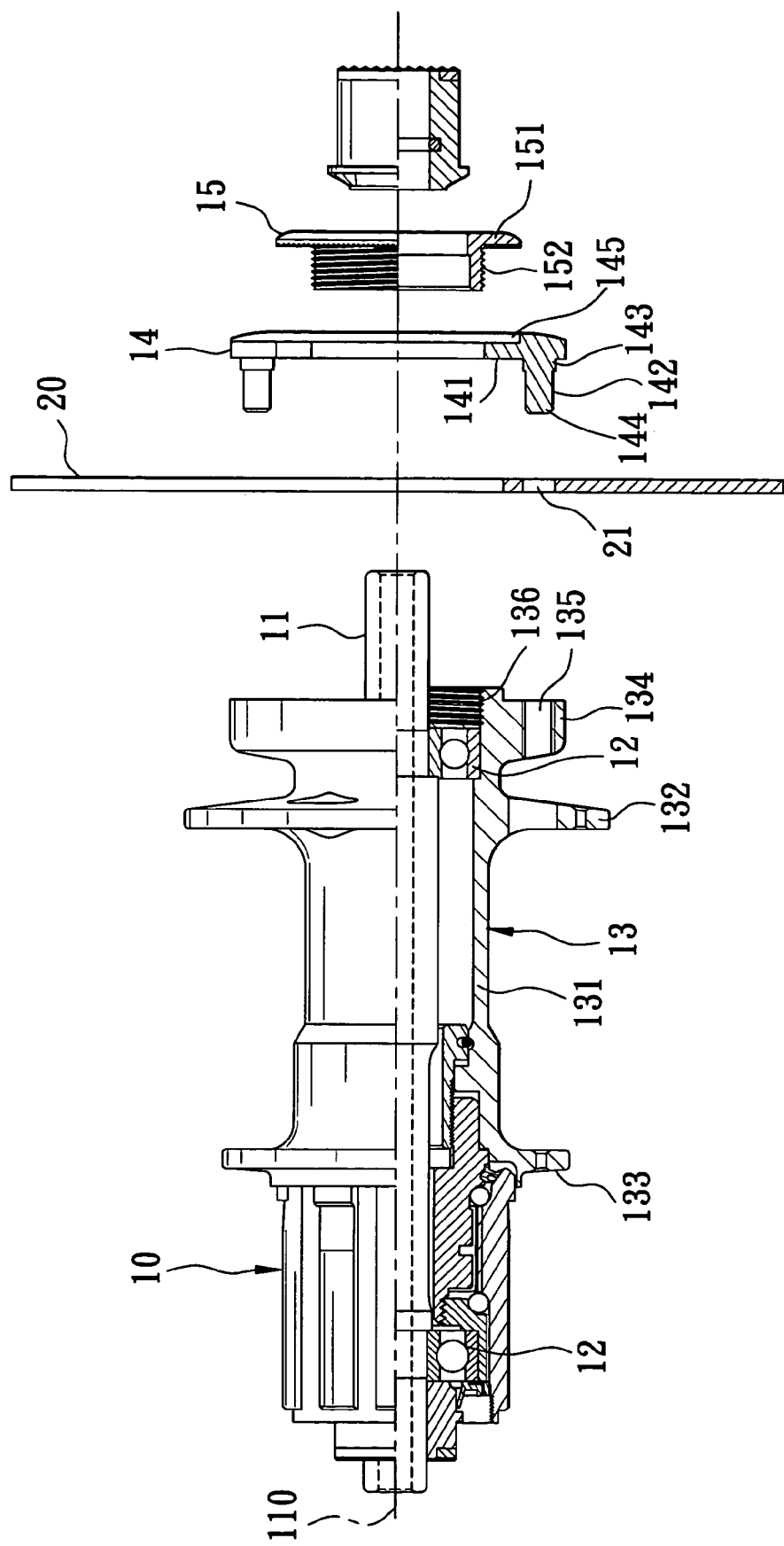
FIG. 1 is a partly sectional exploded view of a brakable wheel hub device disclosed in co-pending U.S. patent application Ser. No. 10/392,992.
Figure 2:
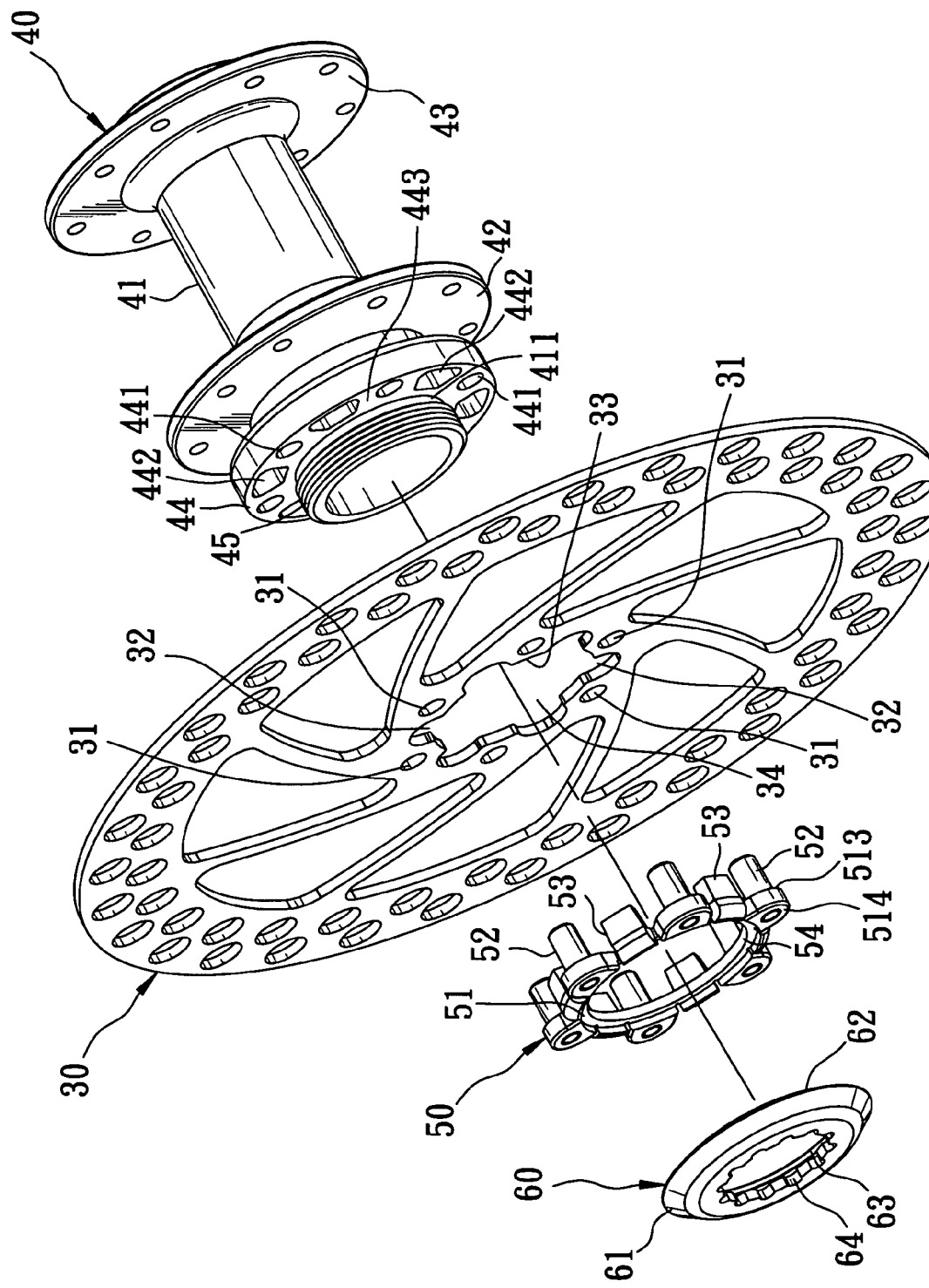
FIG. 2 is an exploded perspective view of the preferred embodiment of a brakable wheel hub device according to this invention.
Figure 3:
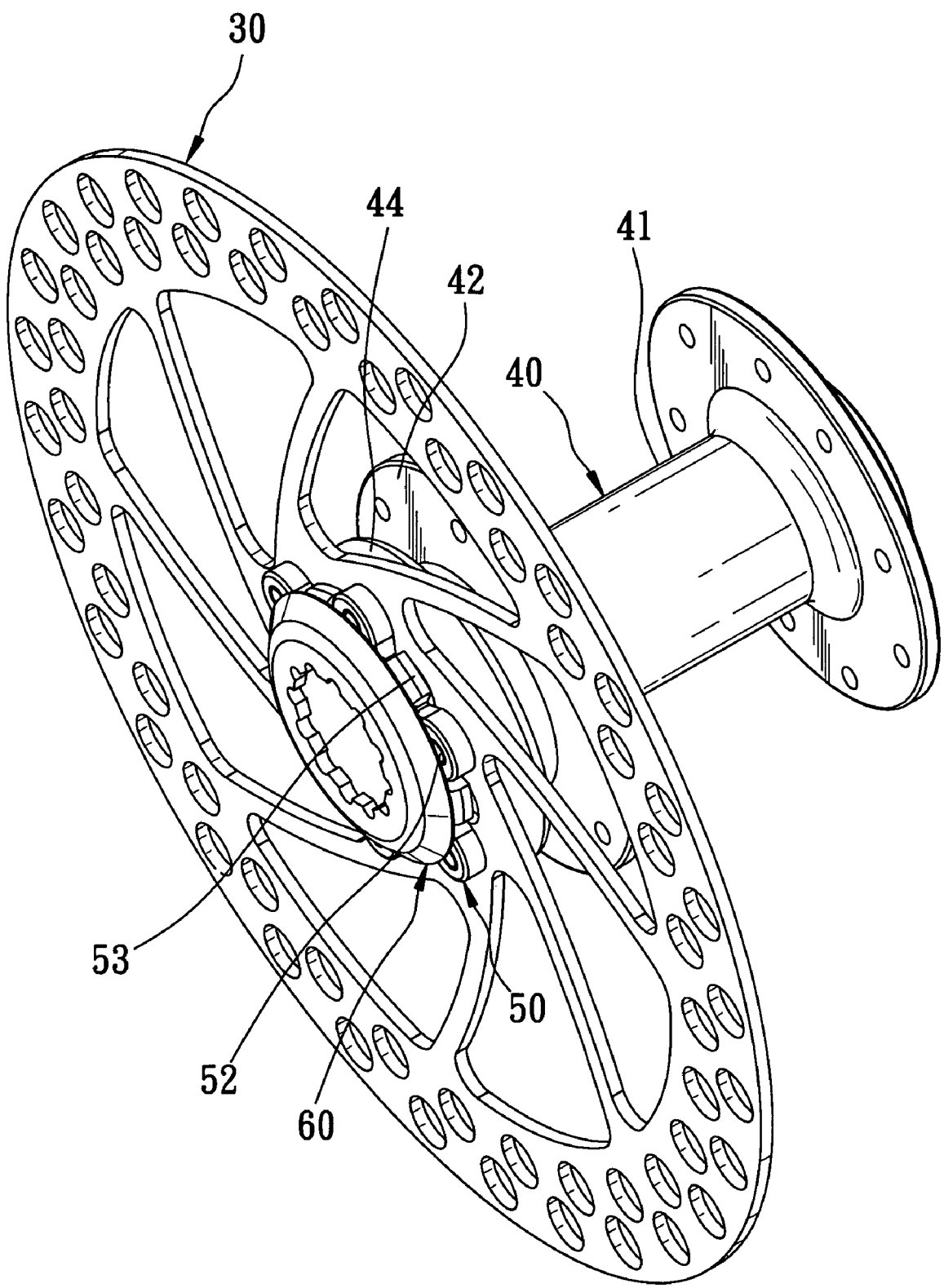
FIG. 3 is a perspective view of the preferred embodiment of this invention.
Figure 4:
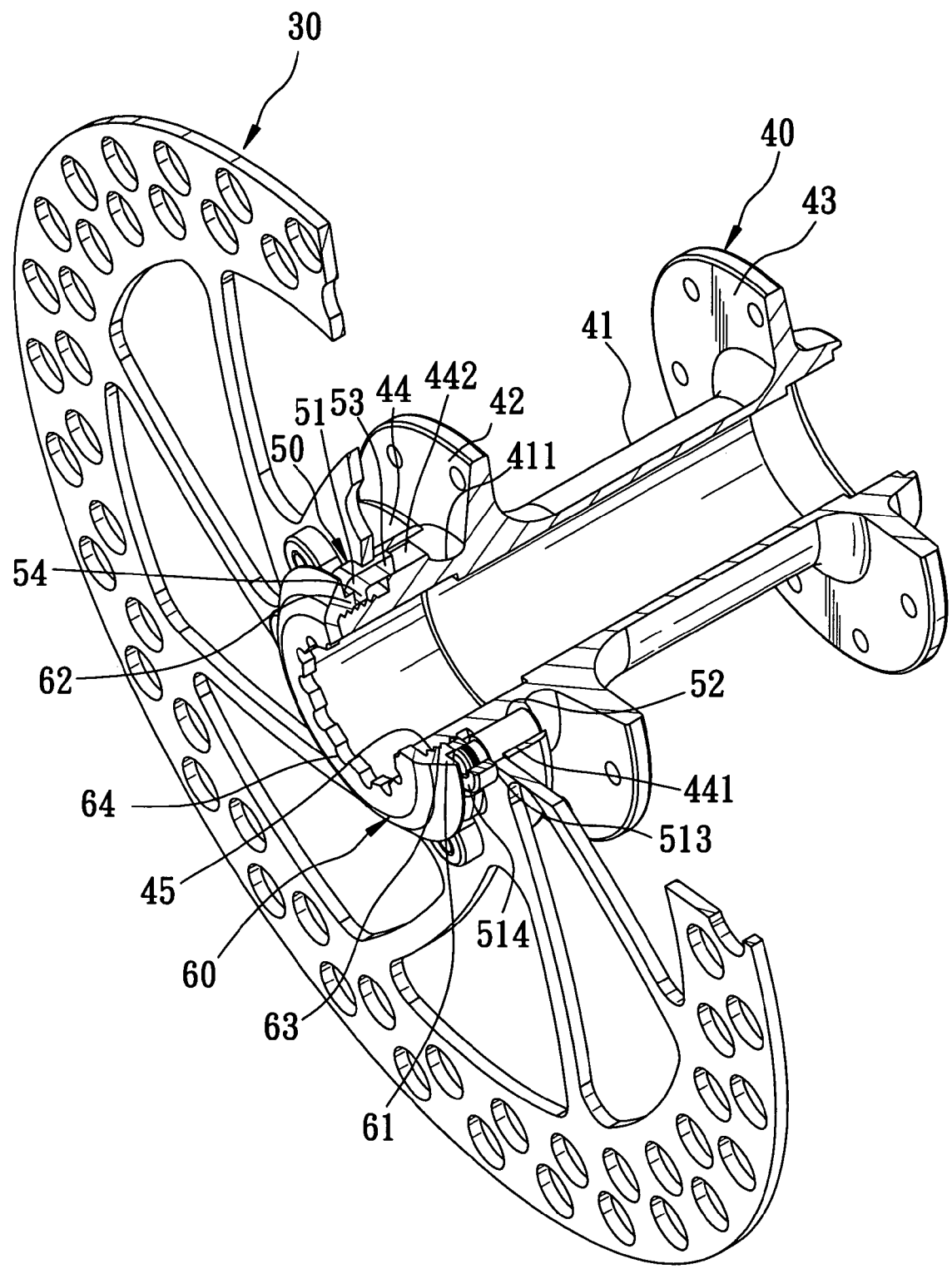
FIG. 4 is a partly cutaway perspective view of the preferred embodiment of this invention.

Referring to FIGS. 2 to 4, the preferred embodiment of a brakable wheel hub device according to the present invention is shown to be disposed to secure a brake disk 30, and comprises a wheel hub shell 40, a positioning ring 50, and a surrounding locking member 60.

Figure 5:
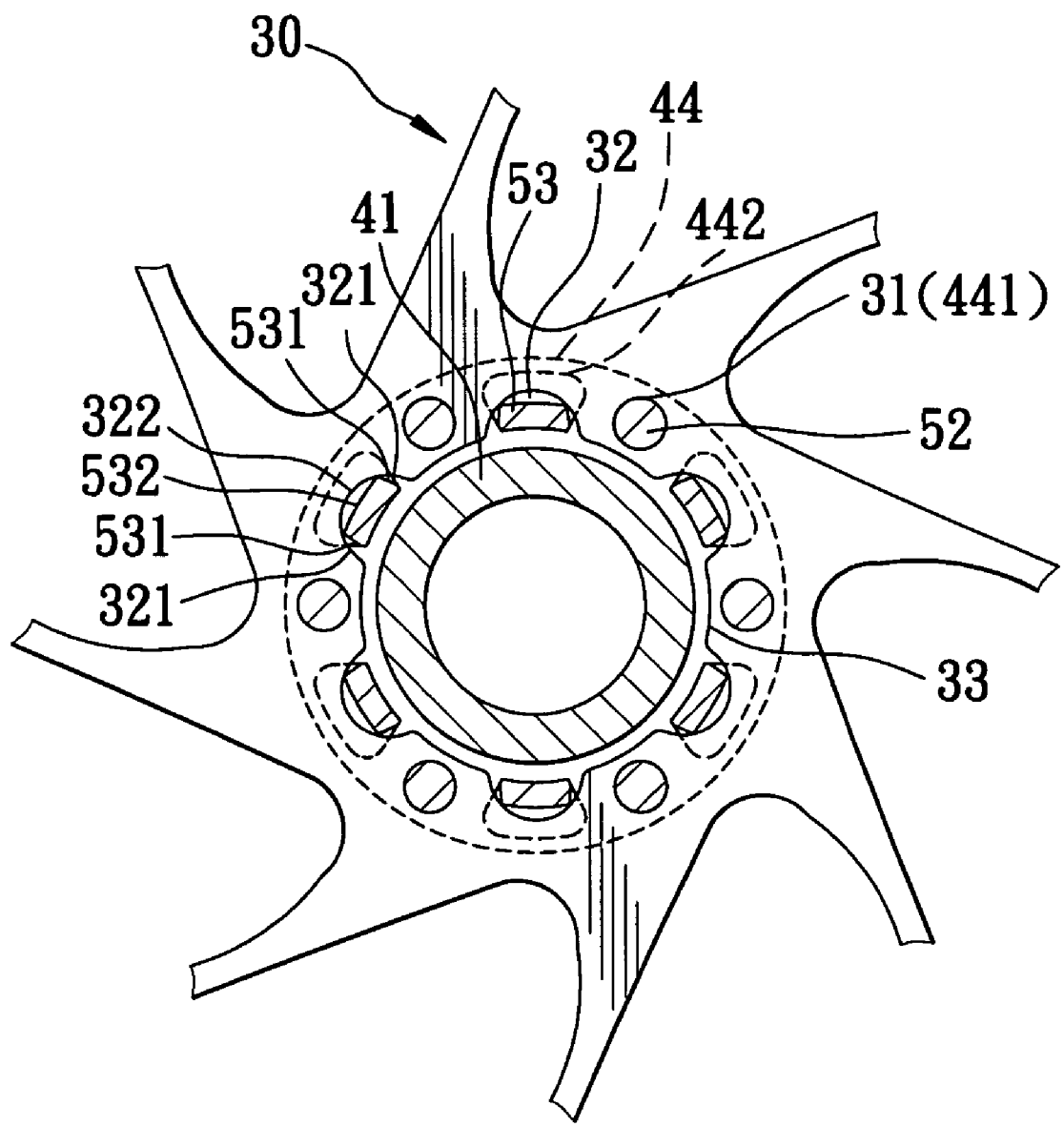
FIG. 5 is a fragmentary cross-sectional view of the preferred embodiment of this invention.

The brake disk 30 is a standard brake disk, and has an inner peripheral wall 33 surrounding an axis to define a mounting hole 34, six through holes 31 offset from the mounting hole 34 and angularly displaced from one another about the axis, and six cutout portion 32 each extending radially and outwardly from the inner peripheral wall 33 and formed between two adjacent ones of the through holes 31. With reference to FIG. 5, each cutout portion 32 has two lateral areas 321 which are spaced apart from each other along a first circumferential line that is coaxial with the inner peripheral wall 33, and which extend radially and outwardly from the inner peripheral wall 33 to converge on a vertex 322.

The wheel hub shell 40 has a surrounding shell wall 41 surrounding the axis, two axially opposite spoke mounting flanges 42, 43 extending radially and outwardly from the surrounding shell wall 41 for engaging wheel spokes (not shown) in a known manner, a first surrounding threaded portion 45 which is an externally threaded surface formed on an end of an outer surrounding wall of the wheel hub shell 40, and a disk securing portion 44 which is spaced apart from the first surrounding threaded portion 45 along the axis to define a disk mounting space 411 therebetween for receiving the brake disk 30. The disk securing portion 44 has an abutting surface 443 which serves to contact the brake disk 30. The disk securing portion 44 has a plurality of insert holes 441 which extend in an axial direction and which are angularly displaced from one another about the axis, and a plurality of engaging holes 442 which extend in the axial direction and each of which is formed between two adjacent ones of the insert holes 441.

The positioning ring 50 includes an annular body 51 surrounding the axis, and has inside and outside surrounding surfaces 513, 514 proximate to and distal from the abutting surface 443, respectively, and a plurality of protrusions 52 (e.g., six protrusions) which extend from the inside surrounding surface 513 in the axial direction and which are respectively adapted to pass through the through holes 31 in the brake disk 30 so as to be fitted into the insert holes 441 in the axial direction, thereby placing the brake disk 30 in a spline engagement with the wheel hub shell 40. The positioning ring 50 further includes a plurality of brake stabilizing members 53 (e.g., six brake stabilizing members) which extend from the inside surrounding surface 513 in the axial direction and which are disposed alternately between two adjacent ones of the protrusions 52. Thus, when the protrusions 52 are brought to pass through the through holes 31 and are fitted into the insert holes 441, respectively, the brake stabilizing members 53 pass through the cutout portions 32 of the brake disk 30 and are inserted into the engaging holes 442, respectively. With reference to FIG. 5, each brake stabilizing member 53 has two flanking walls 531 opposite to each other along a second circumferential line that surrounds the axis, and a distal wall 532 which interconnects the flanking walls 531 and which faces radially and outwardly. Therefore, when the flanking walls 531 of each brake stabilizing member 53 are brought into frictional engagement with the lateral areas 321 of the corresponding cutout portion 32 of the brake disk 30, the distal wall 532 is spaced apart radially from the vertex 321 of the corresponding cutout portion 32, thereby providing a stabilizing force to the brake disk 30 during a braking action. Preferably, each brake stabilizing member 53 is configured to taper gradually from the inside surrounding surface 513 in the axial direction so as to facilitate frictional engagement of the flanking walls 531 with the lateral areas 321 of the corresponding cutout portion 32 and insertion into the corresponding engaging holes 442.

The surrounding locking member 60 is formed as a ring, and has an internally threaded surface to serve as a second surrounding threaded portion 63 which is disposed to threadedly engage the first surrounding threaded portion 45, and an abutting portion 61 which extends radially from the second surrounding threaded portion 63 and which abuts against the outside surrounding surface 514 of the positioning ring 50 when the second surrounding threaded portion 63 threadedly engages the first surrounding threaded portion 45, thereby forcing the inside surrounding surface 513 to abut against the abutting surface 443 of the disk securing portion 44 of the wheel hub shell 40 and to bring the protrusions 52 and the brake stabilizing members 53 into engagement with the insert holes 441 and the engaging holes 442, respectively. The surrounding locking member 60 further includes an annular abutment 62 extending in the axial direction from the abutting portion 61 to frictionally engage an inner ring portion 54 of the positioning ring 50. Preferably, a polygonal tool inserting bore 64 is formed in the surrounding locking member 60 and extends along the axis for insertion of a hand tool (not shown) to rotate the surrounding locking member 60.

As illustrated, by the engagement of the brake stabilizing members 53 with the cutout portions 32 and the engaging holes 442, a stabilizing force can be provided to the brake disk 30 during the braking action, thereby prolonging the service life of the brakable wheel hub device according to this invention.

It is noted that the number of the brake stabilizing members 53 may be varied as long as the brake stabilizing members 53 are disposed opposite to each other relative to the axis. Furthermore, the first and second surrounding threaded portions 45,63 may be interchanged with each other, i.e., internally and externally threaded surfaces are formed on the wheel hub shell 40 and the surrounding locking member 60, respectively.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A brakable wheel hub device adapted to secure a brake disk which has an inner peripheral wall surrounding an axis to define a mounting hole, a plurality of through holes offset from the mounting hole and angularly displaced from one another about the axis, and a plurality of cutout portions each extending radially and outwardly from the inner peripheral wall and formed between two adjacent ones of the through holes, each of the cutout portions having two lateral areas which are spaced apart from each other along a first circumferential line that is coaxial with the inner peripheral wall, and which extend radially and outwardly from the inner peripheral wall to converge on a vertex, said brakable wheel hub device comprising:

a wheel hub shell having a first surrounding threaded portion which surrounds the axis, and a disk securing portion which is spaced apart from said first surrounding threaded portion along the axis to define a disk mounting space therebetween that is adapted to receive the brake disk, said disk securing portion having an abutting surface which is adapted to contact the brake disk and which has a plurality of insert holes that extend in an axial direction and that are angularly displaced from one another about the axis, and a plurality of engaging holes that extend in the axial direction and that are respectively formed between two adjacent ones of said insert holes;

a positioning ring surrounding the axis, and including inside and outside surrounding surfaces proximate to and distal from said abutting surface, respectively, a plurality of protrusions which extend from said inside surrounding surface in the axial direction and which are respectively adapted to pass through the through holes in the brake disk so as to be fitted into said insert holes in the axial direction, thereby placing the brake disk in a spline engagement with said wheel hub shell, and a plurality of brake stabilizing members which extend from said inside surrounding surface in the axial direction and which are respectively disposed between two adjacent ones of said protrusions such that when said protrusions are brought to pass through the through holes and are fitted into said insert holes, respectively, said brake stabilizing members pass through the cutout portions of the brake disk and are inserted into said engaging holes, respectively, each of said brake stabilizing members having two flanking walls opposite to each other along a second circumferential line that surrounds the axis so as to be brought into frictional engagement with the lateral areas of the corresponding cutout portion of the brake disk, thereby providing a stabilizing force to the brake disk during a braking action; and a surrounding locking member including a second surrounding threaded portion which is disposed to threadedly engage said first surrounding threaded portion, and an abutting portion which extends radially from said second surrounding threaded portion and which abuts against said outside surrounding surface of said positioning ring when said second surrounding threaded portion threadedly engages said first surrounding threaded portion, thereby forcing said inside surrounding surface to abut against said abutting surface of said disk securing portion of said wheel hub shell and to bring said protrusions and said brake stabilizing members into engagement with said insert holes and said engaging holes, respectively.

2. The brakable wheel hub device of claim 1, wherein each of said brake stabilizing members has a distal wall which interconnects said flanking walls and which faces radially and outwardly so as to be spaced apart from the vertex of the corresponding cutout portion of the brake disk.

3. The brakable wheel hub device of claim 2, wherein each of said brake stabilizing members is configured to taper gradually from said inside surrounding surface in the axial direction so as to facilitate frictional engagement of said flanking walls with the lateral areas of the corresponding cutout portion and insertion into the respective one of said engaging holes.

4. The brakable wheel hub device of claim 2, wherein said wheel hub shell has an outer surrounding wall surrounding the axis and formed with an externally threaded surface that serves as said first surrounding threaded portion, said surrounding locking member being formed as a ring, and having an internally threaded surface which surrounds the axis and which serves as said second surrounding threaded portion.

* * * * *